(12) United States Patent
Cartagena et al.

(10) Patent No.: US 12,356,056 B1
(45) Date of Patent: Jul. 8, 2025

(54) MECHANICAL ASSEMBLY FOR CAMERA SYSTEMS

(71) Applicant: Amazon Technologies, Inc., Seattle, WA (US)

(72) Inventors: Gregory Cartagena, New York, NY (US); Dincer Bozkaya, Andover, MA (US); Sara Jean Woo, Andover, MA (US); Caroline Anne Keely, Wakefield, MA (US)

(73) Assignee: Amazon Technologies, Inc., Seattle, WA (US)

( * ) Notice: Subject to any disclaimer, the term of this patent is extended or adjusted under 35 U.S.C. 154(b) by 366 days.

(21) Appl. No.: 17/853,592

(22) Filed: Jun. 29, 2022

(51) Int. Cl.
| | | |
|---|---|---|
| H04N 23/52 | (2023.01) | |
| G02B 7/02 | (2021.01) | |
| H04N 13/239 | (2018.01) | |
| H04N 23/45 | (2023.01) | |
| H04N 23/51 | (2023.01) | |
| H04N 23/55 | (2023.01) | |

(52) U.S. Cl.
CPC ............. *H04N 23/45* (2023.01); *G02B 7/028* (2013.01); *H04N 13/239* (2018.05); *H04N 23/51* (2023.01); *H04N 23/52* (2023.01); *H04N 23/55* (2023.01)

(58) Field of Classification Search
CPC ...... H04N 23/45; H04N 13/239; H04N 23/52; H04N 23/55; G02B 7/028
See application file for complete search history.

(56) References Cited

U.S. PATENT DOCUMENTS

| | | | | |
|---|---|---|---|---|
| 8,970,700 | B2 * | 3/2015 | Inoue | H04N 23/52 |
| | | | | 348/148 |
| 11,089,187 | B2 * | 8/2021 | Kraz | H04N 23/51 |
| 11,277,941 | B1 * | 3/2022 | Raghupathy | H05K 7/20454 |
| 2005/0254358 | A1 * | 11/2005 | Kosako | H04N 23/51 |
| | | | | 369/44.14 |
| 2013/0077257 | A1 * | 3/2013 | Tsai | G06F 1/20 |
| | | | | 361/720 |
| 2016/0227078 | A1 * | 8/2016 | Oh | G03B 17/55 |
| 2017/0289420 | A1 * | 10/2017 | Reiche | H04N 23/54 |
| 2018/0039162 | A1 * | 2/2018 | Ali | G02B 7/028 |
| 2018/0259831 | A1 * | 9/2018 | Chiu | H04N 23/90 |
| 2018/0267390 | A1 * | 9/2018 | Kim | H04N 23/52 |
| 2018/0376037 | A1 * | 12/2018 | Arai | H05K 7/20172 |
| 2019/0163037 | A1 * | 5/2019 | Koyama | G03B 17/55 |
| 2019/0377244 | A1 * | 12/2019 | Katayama | H04N 23/51 |
| 2022/0070375 | A1 * | 3/2022 | Eckman | H04N 23/50 |
| 2022/0272236 | A1 * | 8/2022 | Yamagata | H04N 23/51 |

* cited by examiner

*Primary Examiner* — Mohamed A. Wasel
(74) *Attorney, Agent, or Firm* — Eversheds Sutherland (US) LLP

(57) ABSTRACT

Techniques and apparatus for mechanical assembly of an imaging device are described. An example image sensor assembly disposed within an imaging device includes a circuit board, an image sensor disposed on the circuit board, and an optics holder. The optics holder includes a support location, a thermally conductive material, and a plurality of extended surfaces that extend outward in a direction away from the circuit board. Each of the plurality of extended surfaces includes the thermally conductive material. The image sensor assembly also includes an optical lens disposed in the support location of the optics holder. The circuit board is disposed between the optics holder and a housing of the imaging device.

18 Claims, 18 Drawing Sheets

MECHANICAL ASSEMBLY FOR CAMERA SYSTEMS

BACKGROUND

The present invention relates to camera systems (or devices), and more specifically, to a mechanical assembly for a camera system.

3D sensor technology (or 3D sensing technology) is increasingly being used in a variety of applications, including, for example, industrial and factory automation, access control, imaging and navigation, obstacle detection, autonomous robots, augmented reality (AR), virtual reality (VR), etc. In these applications, 3D sensors can be used to determine range or depth information about a target(s) in a scene. The range information can be used to generate 3D images (or maps) of the target(s). Some examples of 3D sensor technology include stereoscopic (or stereo) vision, time-of-flight (ToF), light detection and ranging (LIDAR), etc. The performance of a 3D sensor may be based on the accuracy of the 3D sensor to measure depth within a scene. This accuracy, in turn, may be based on the calibration of parameter(s) of the 3D sensor.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

DETAILED DESCRIPTION

Figure 1:
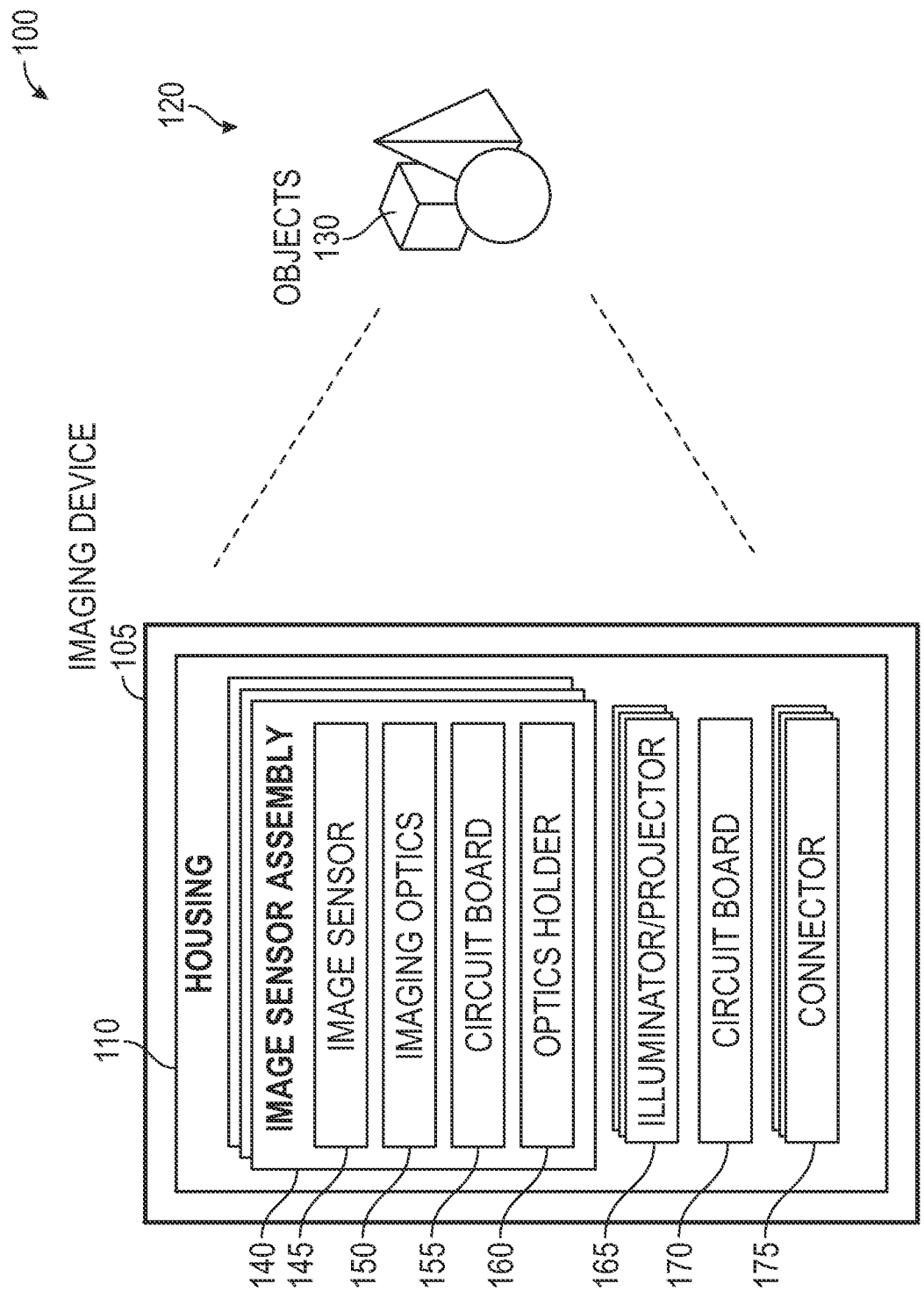
FIG. 1 illustrates an example system, according to one embodiment.

The assembly and calibration of 3D sensors is a process that involves high precision and substantial technical coordination across various parameters, including, for example, material stiffness, assembly tolerance, thermal dissipation, firmware calibration domains, etc. As such, camera designs generally address one or more of the above parameters in order to maximize the performance of the 3D sensor. The performance of a 3D sensor, for example, can be based on one or more metrics, which can include, but are not limited to, depth accuracy, fill ratio, planar angle deviations, etc. In a 3D sensor, such as a stereo camera, the stereo camera can be calibrated to reduce the depth error and maximize the fill ratio (or fill density) of the 3D images that the stereo camera generates.

In many cases, however, the performance of a 3D sensor can be affected by multiple error sources, including alignment and calibration errors of 3D sensor parameter(s), environmental phenomena (e.g., shock, vibration, temperature, moisture, etc.), and the like. In an exemplary case of a (active or passive) stereo camera, which includes two image sensors (or cameras or imagers) separated by a baseline, the performance of the stereo camera is generally a function of intrinsic parameters (e.g., the calibration of each imaging camera) and extrinsic parameters (e.g., the calibration of the two imaging cameras with respect to each other). When the stereo camera is subjected to one or more phenomena, such as shock, vibrations, certain temperatures, etc., the stereo camera can become uncalibrated (or fall out of calibration). For example, small changes in calibration of the stereo camera due to these phenomena can result in decreased performance (e.g., loss of depth accuracy, reduction of fill ratio, etc.).

To address this, embodiments described herein provide a mechanical design for assembling 3D sensors (e.g., stereo cameras, RGB cameras, infrared (IR) cameras, multi-base imaging cameras, etc.) that significantly improves the robustness of 3D sensors to phenomena that can impact calibration of the 3D sensors. More specifically, embodiments describe a mechanical design that can achieve one or more target parameters (e.g., part stiffness, thermal dissipation, assembly tolerance error minimization) for achieving high performance (e.g., highly accurate depth maps) in 3D sensors.

As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

FIG. 1 illustrates an example system 100 with an imaging device 105, according to one embodiment. The system 100 may be located in an environment, such as a facility (e.g., warehouse, factory, distribution center, fulfillment center, etc.). In general, the system 100 can be disposed in any type of environment, including, for example, indoor environments and outdoor environments.

Within the system 100, the imaging device 105 may be used to capture one or more images of a scene 120, which includes one or more objects 130 (also referred to as targets). That is, the object(s) 130 may be within a field-of-view (FOV) of the imaging device 105. The imaging device 105 may generate depth information regarding one or more of the objects 130 within the scene 120. Such depth information can be used for a variety of applications, including, but not limited to, navigation, obstacle detection, object detection, access control, industrial and factory automation, etc.

The imaging device 105 (also referred to as an imaging camera) is representative of a variety of different types of imaging devices, including, for example, active stereo cameras, passive stereo cameras, ToF cameras, multi-base imaging cameras, standalone imaging cameras, etc. The imaging device 105 can include hardware components, software components, or combinations thereof. Although not shown, the imaging device 105 may be integral to (or integrated with) another apparatus, such as a drive unit, robotic arm, transport device (e.g., conveyor, cart, pallet, etc.), computing system, etc.

Here, the imaging device 105 includes one or more image sensor assemblies 140, one or more illuminators/projectors 165, a circuit board 170, and one or more connectors 175. The imaging device 105 also includes a housing 110, which may include (and/or support) the one or more sensor assemblies 140, one or more illuminators/projectors 165, circuit board 170, and the one or more connectors 175. The housing 110 may be formed from a variety of suitable materials, including, for example, metallic materials, plastic materials, etc. In one particular embodiment, the housing 110 includes thermally conductive material, such as aluminum.

Each image sensor assembly 140 includes an image sensor 145, one or more imaging optics 150, a circuit board 155, and an optics holder 160. The image sensor 145 is representative of a variety of types of electronic image sensors, including, for example complementary-metal-oxide-semiconductor (CMOS) image sensors, charged-coupled device (CCD) image sensors, etc. Additionally, the image sensor 145 can include a RGB camera sensor, grayscale camera sensor, or infrared (IR) camera sensor. The image sensor 145 may use a rolling shutter or a global shutter.

The imaging optic(s) 150 may include various optics, such as an optical lens with a particular focal length, optical filters, mirrors, polarizers, diffusers, etc. The circuit board 155 may include one or more components, including, but not limited to, cache, clock circuits, input/output subsystems, image sensors, connectors, power supplies, and the like (and combinations thereof). Although not shown, one or more of the components of the image sensor assembly 140 may be coupled to a controller (including a programmable central processing unit (CPU) operable with a memory). In certain embodiments described below, one or more of the image sensor 145, imaging optic(s) 150, and optics holder 160 may be disposed on (or attached to) the circuit board 155 in a manner that increases (relative to conventional sensor assemblies) robustness of the image sensor to various phenomena, such as shock, vibrations, temperature changes, moisture, etc., in order to improve the performance of the image sensor 145. In one particular embodiment, the circuit board 155 is a printed circuit board (PCB) assembly (PCBA).

The optics holder 160 is configured to provide support for the imaging optic(s) 150. In one embodiment described herein, the optics holder 160 is a thermally conductive structure that provides support for an optical lens. The optics holder 160 may be formed from a variety of conductive materials. In one particular embodiment, the optics holder 160 includes aluminum. Note the optics holder 160 is described in greater detail below.

The imaging device 105 may include a respective image sensor assembly 140 for each image sensor 145 within the imaging device 105. In one embodiment, the imaging device 105 includes a single image sensor assembly 140 for a single image sensor 145. In this embodiment, the imaging device 105 may be a ToF camera. In another embodiment, the imaging device 105 includes multiple image sensor assemblies 140 for multiple image sensors 145. For example, the imaging device 105 may be a stereo camera with at least two image sensors 145. In another example, the imaging device 105 may include a stereo camera (with at least two image sensors 145) and a RGB camera (with one image sensor 145). In another example, the imaging device 105 may be a multi-base imaging camera having at least three imaging sensors 145. In this example, a first imaging sensor 145 may be separated from a second imaging sensor 145 by a first baseline, and the first imaging sensor 145 may be separated from a third imaging sensor 145 by a second baseline. The second baseline may be larger than the first baseline. In this example, the first and second imaging sensors 145 may be used as a first stereo camera, and the first and third imaging sensors 145 may be used as a second stereo camera. In general, the imaging device 105 can include any number of image sensors 145 (which may be of the same type, different types, or combinations thereof).

The illuminator/projector(s) 165 is generally configured to illuminate light and/or project a structured light pattern onto the scene 120. In certain embodiments, the illuminator/projector(s) 165 is an IR projector. The circuit board 170 is representative of a main circuit board for the imaging device 105. The circuit board 170 may include various components, including, but not limited to, cache, clock circuits, input/output subsystems, image sensors, connectors, power supplies, and the like (and combinations thereof). One or more of the components of the circuit board 170 may be coupled to one or more components of the circuit board(s) 155 within the one or more image sensor assemblies 140. In one embodiment, the circuit board 170 is a PCBA.

The imaging device 105 also includes one or more connectors 175, which are generally used to couple one or more of the components of the imaging device 105 to other component(s) of the imaging device 105. The connector(s) 175 may include rigid structures, flexible connectors, or combinations thereof. In the case of an exemplary stereo camera with two image sensor assemblies 140 1-2, a flexible connector may be used to couple the image sensor assembly 140-1 to the image sensor assembly 140-2.

Note that FIG. 1 illustrates a reference example configuration of an imaging device 105 and that, in other embodiments, imaging device 105 may have a different configuration consistent with the functionality described herein. For example, while FIG. 1 depicts the imaging device 105 with an illuminator/projector 165, in other embodiments, the imaging device 105 may not include an illuminator/projector 165. In another example, although not shown in FIG. 1, the imaging device 105 may include a network interface (e.g., Ethernet, serial, wireless, etc.), which is configured to communicate with one or more computing systems (or devices) via wired communication links and/or wireless communications links. That is, such a network interface may support wireless communication protocols (e.g., WiFi, cellular communications, etc.) and/or wired communication protocols (e.g., Universal Serial Bus (USB), such as USB-3).

As noted, the system 100 described herein may be deployed in various environments, including, for example, indoor environments and outdoor environments. FIGS. 2A-2D illustrate different environments 200 A-D, respectively, in which the system 100 can be deployed, according to various embodiments. As used herein, the term environment may also be referred to as a workspace.

Figure 2A:
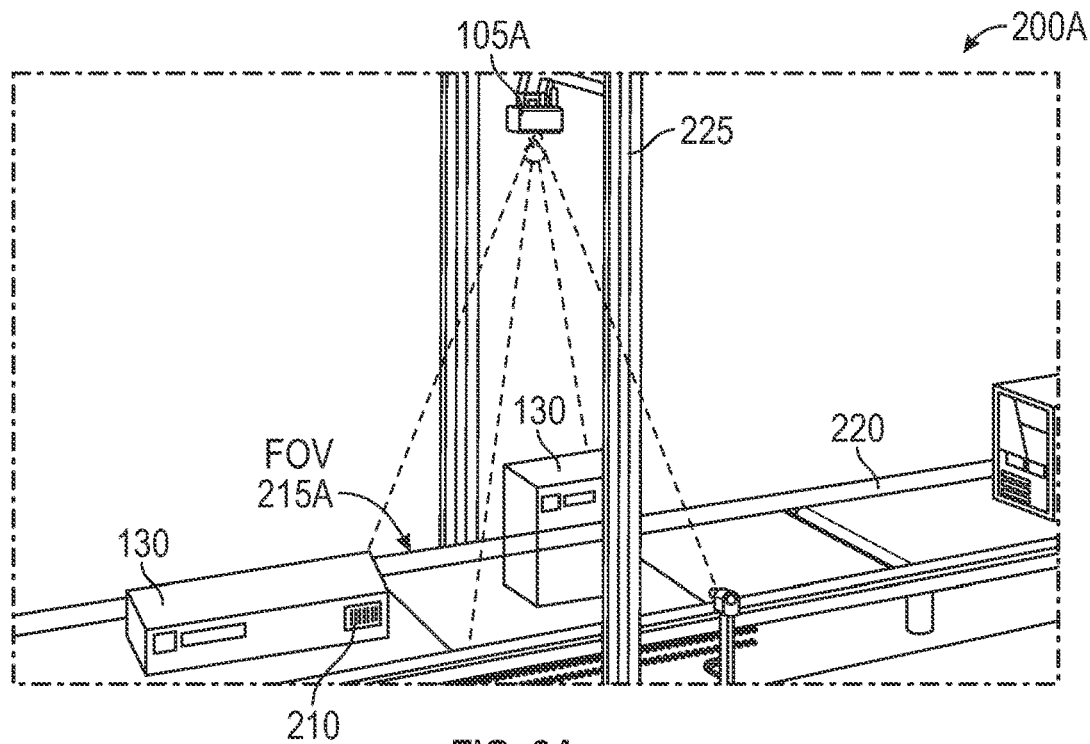
FIGS. 2A-2D illustrate different examples of workspaces within the system of FIG. 1, according to various embodiments.

In FIG. 2A, the environment 200A includes a transport device 220 (e.g., conveyer), which transitions objects 130 under an imaging device 105A for item identification (e.g., a structured identifier 210 on the object 130 can be detected and decoded by the imaging device 105A). The imaging device 105A may be supported by a frame 225 (e.g., the frame 225 may have one or more mounting locations for deploying the imaging device 105A). As shown, the imaging device 105A has a FOV 215A that covers a portion of the surface of the transport device 220.

Figure 2B:
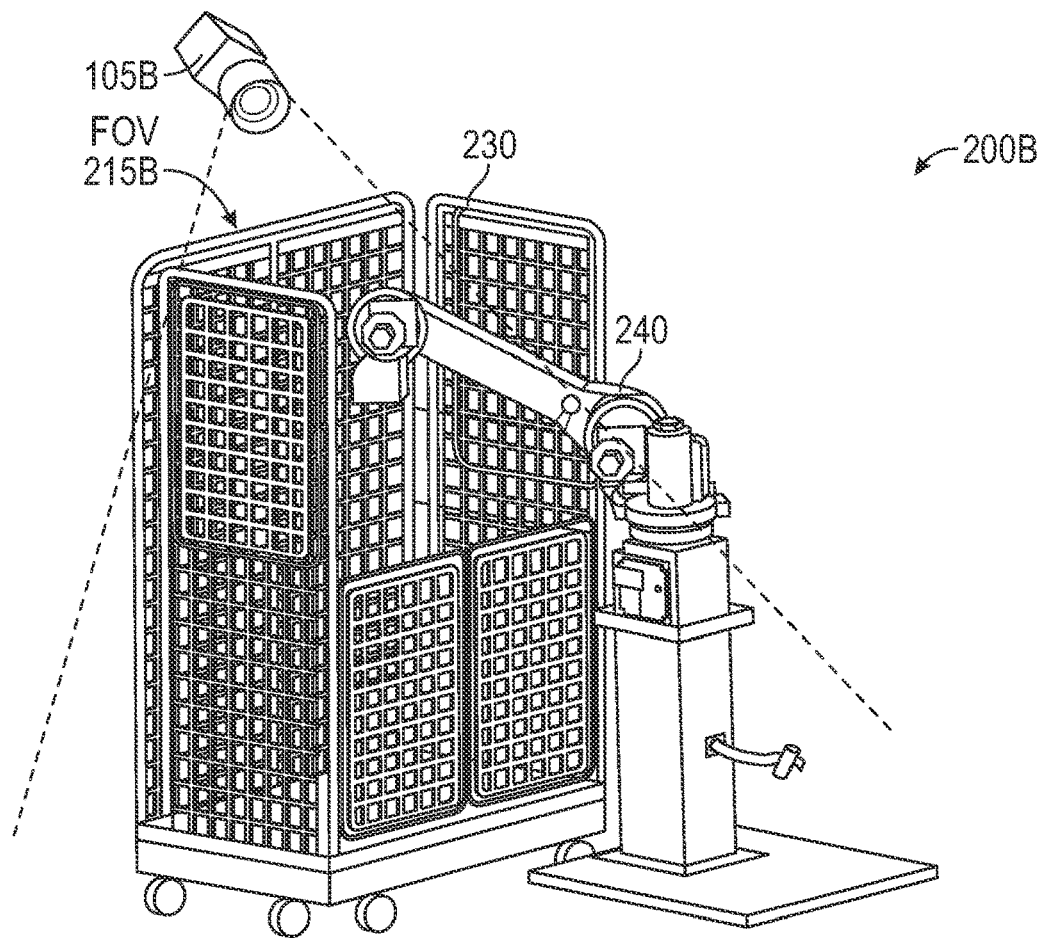
Figure 2C:
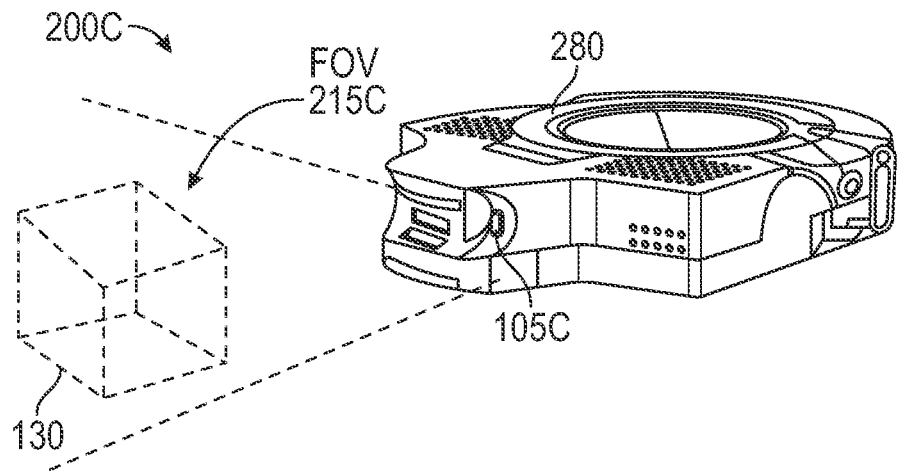

In FIG. 2B, the environment 200B includes a robotic arm 240 that packs objects into a transport device 230. Here, the imaging device 105B has a FOV 215B, which encompasses a substantial portion of the transport device 230. In FIG. 2C, the environment 200C includes a drive unit 280, which includes an imaging device 105C. The imaging device 105C may be used to navigate within the environment, perform obstacle detection (e.g., detecting object(s) 130 within a FOV 215C of the imaging device 105C), perform obstacle avoidance (e.g., avoiding object(s) 130 in a path of the drive unit 280), etc.

Figure 2D:
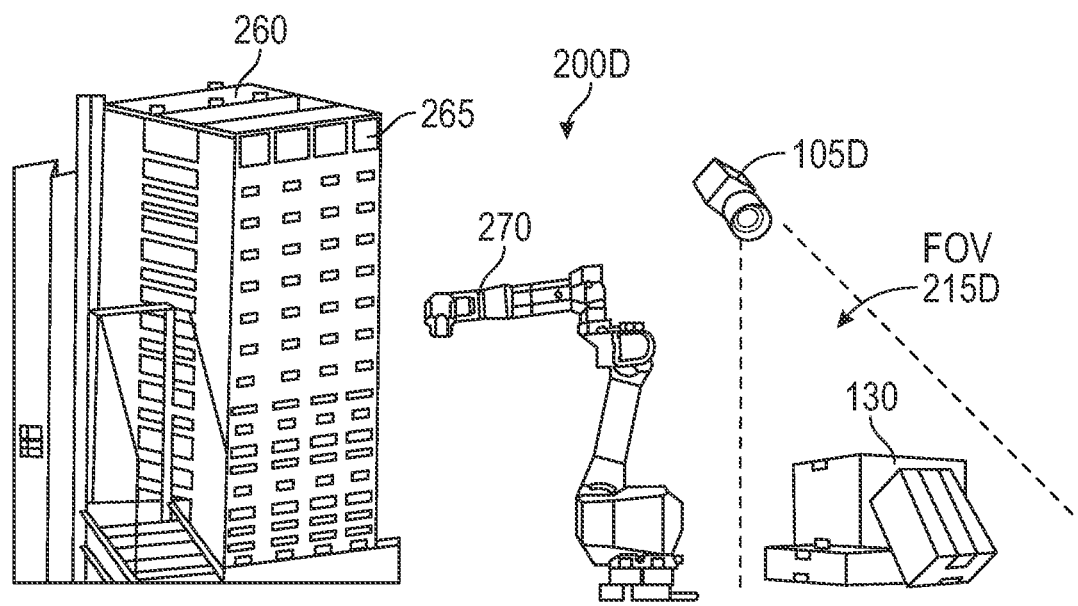

In FIG. 2D, the environment 200D includes a robotic arm 270 that retrieves object(s) 130 from a holding area and stows the object(s) 130 into a container 265 within an inventory holder 260. Here, the imaging device 105D has a FOV 215D, which encompasses the holding area.

Figure 3A:
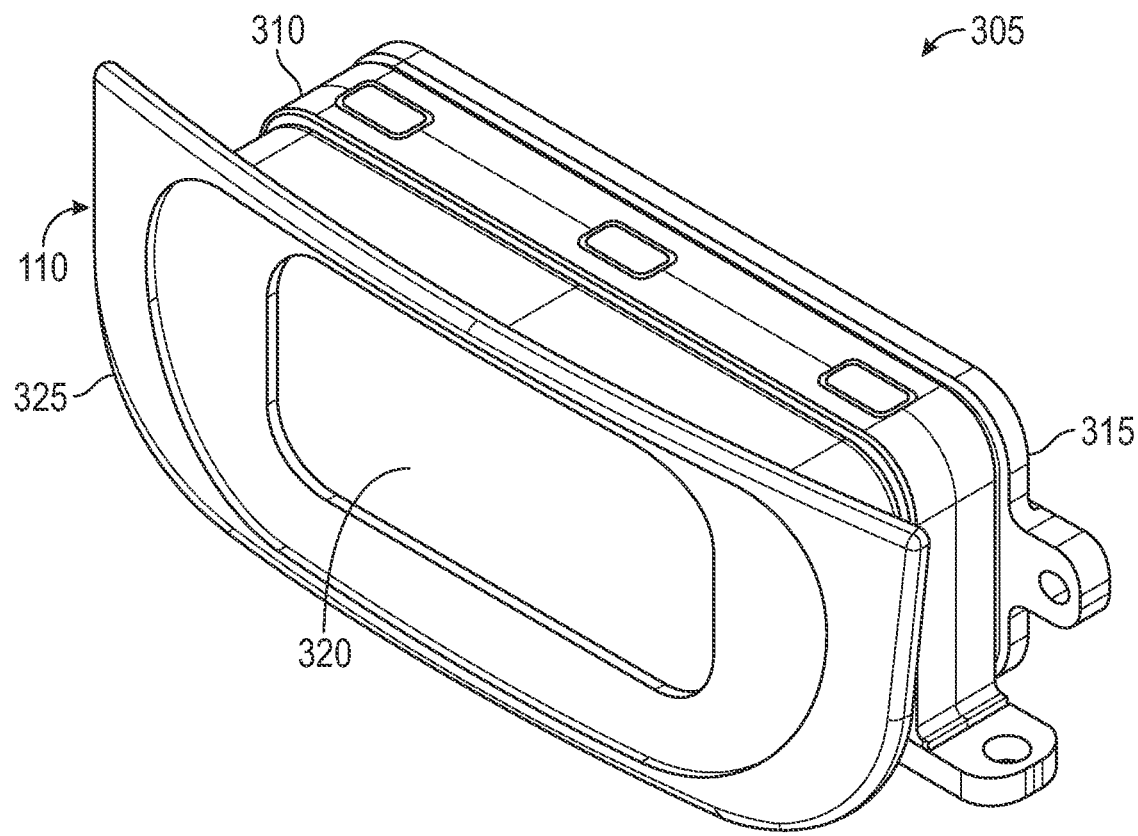
FIGS. 3A-3E illustrate different views of an example imaging device, according to one embodiment.
Figure 3B:
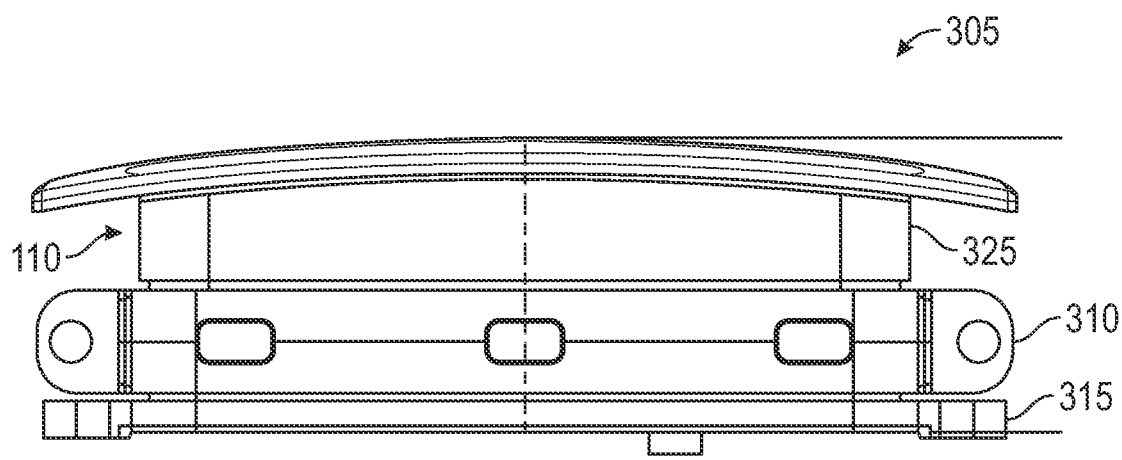
Figure 3C:
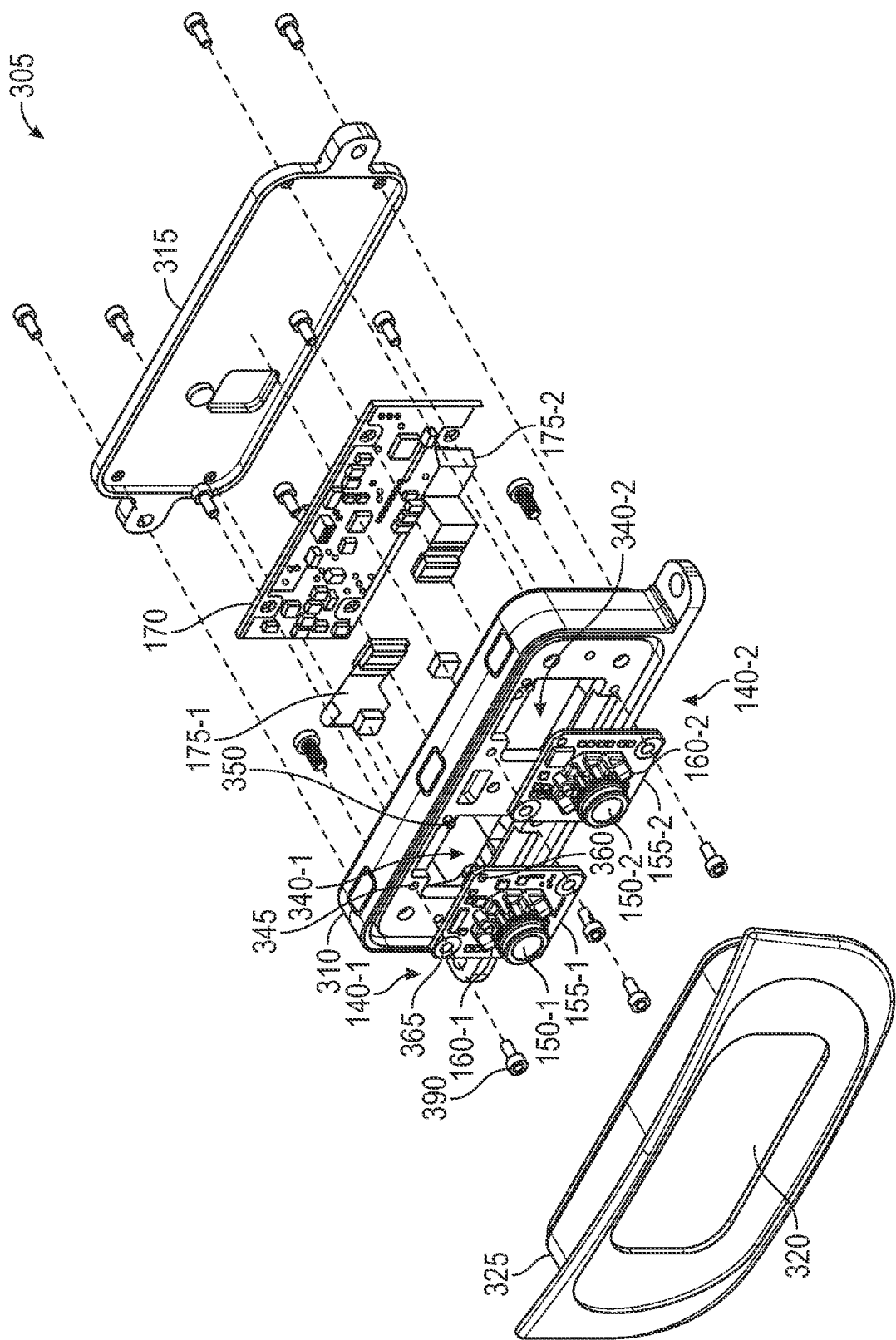
Figure 3D:
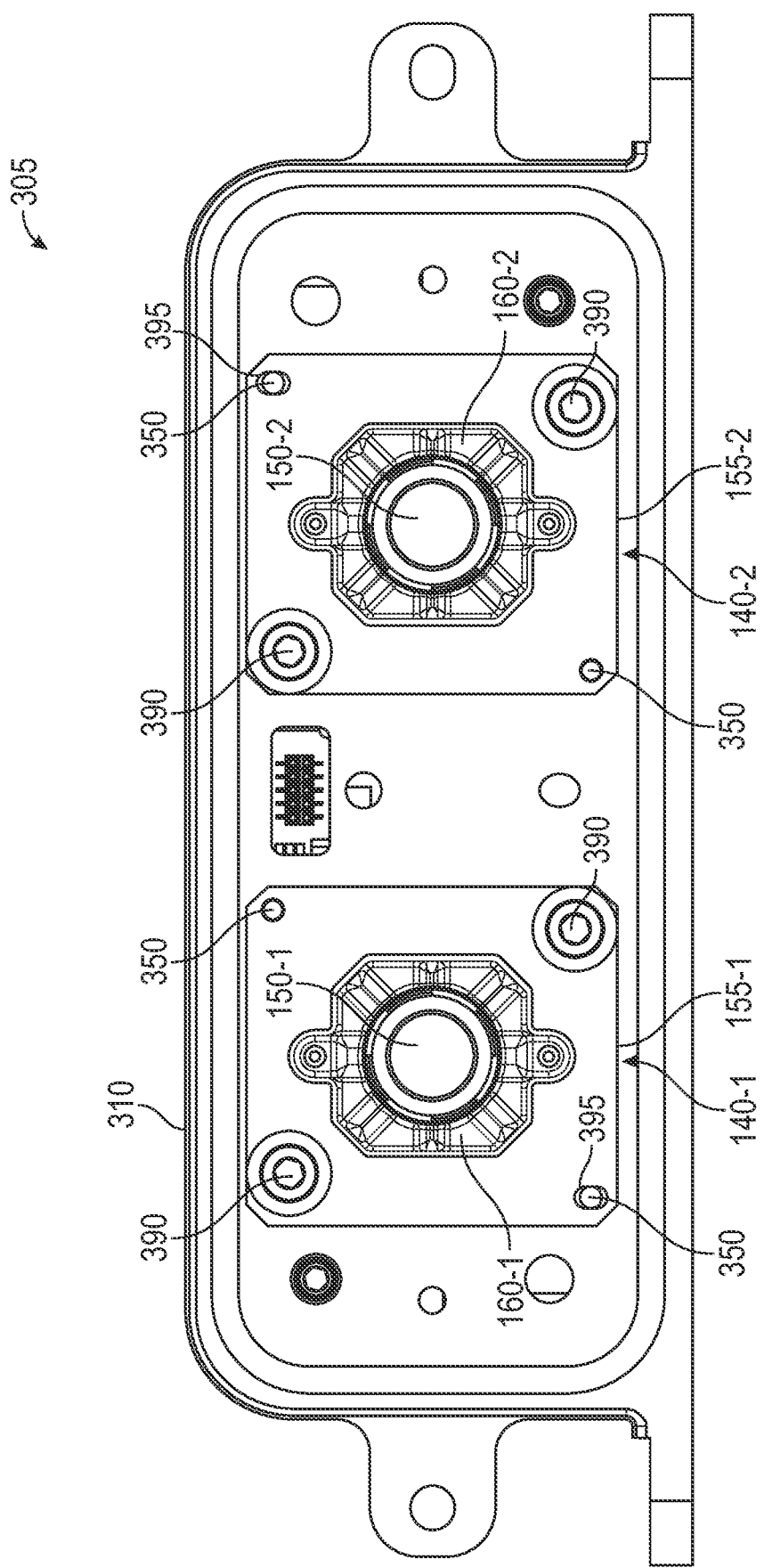
Figure 3E:
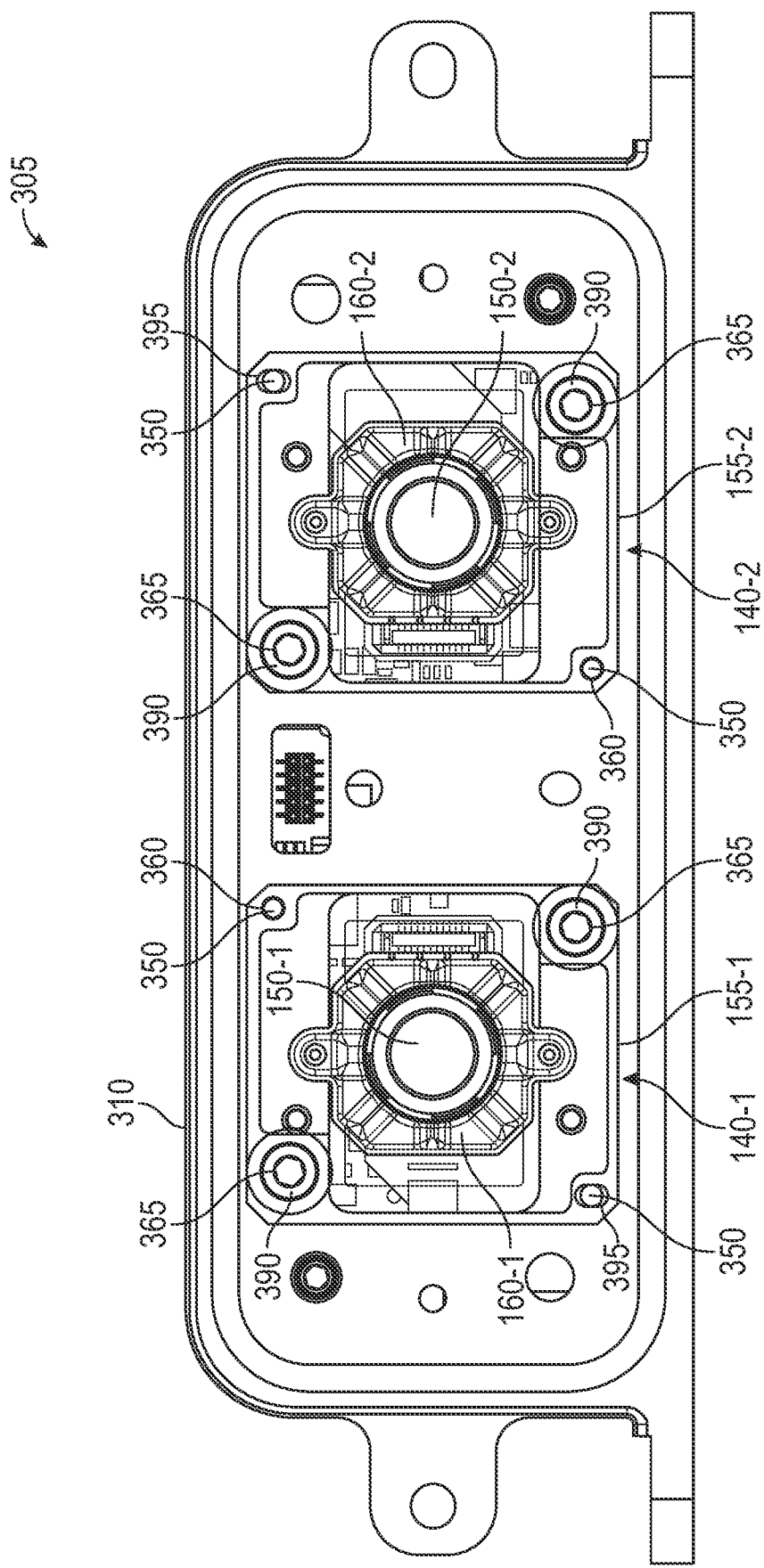

FIGS. 3A-3E illustrate different views of an example imaging device 305, according to one embodiment. In particular, FIG. 3A depicts a perspective view of the imaging device 305, FIG. 3B depicts a top view of the imaging device 305, FIG. 3C depicts an exploded view of the imaging device 305, FIG. 3D depicts a front cross-sectional view of the imaging device 305, and FIG. 3E depicts another front cross-sectional view of the imaging device 305, according to one embodiment. The imaging device 305 is a representative embodiment of the imaging device 105 depicted in FIG. 1. For example, in the depicted embodiment, the imaging device 305 is a stereo camera with two image sensors 145. Note the two image sensors 145 are not shown in FIGS. 3A-3E.

As noted, embodiments described herein provide a mechanical assembly design for an imaging device that mitigates effects of various phenomena (e.g., shock, vibrations, temperature changes, moisture, etc.) on the performance of the imaging device. In the embodiment depicted in FIGS. 3A-3E, the imaging device 305 includes a housing 110 having a (front) portion 325, a (middle) portion 310, and a (back) portion 315 (FIGS. 3A-3C). The portions 325, 310, and 315 of the housing 110 may be connected via one or more fastening components. Each portion 325, 310, and 315 may be formed from a variety of (or combinations of) materials, including, for example, plastic, glass, metals, etc. In particular embodiment, one or more of the portions 325, 310, and 315 includes a thermally conductive material, such as aluminum. As used herein, a fastening component (also referred to as a fastener) is representative of a variety of mechanical hardware used to attach (or secure) component(s) to other component(s). Examples of such hardware include, but are not limited to, anchors, bolts, nails, nuts, pins, clips, rivets, rods, screws, sockets, clamps, hangers, washers, etc.

The portion 325 of the housing 110 may be used as a front cover for the imaging device 305. For example, the portion 325 may cover one or more imaging optics 150 of one or more respective image sensor assemblies 140. In certain embodiments, the portion 325 of the housing also includes a cover 320. The cover 320 may be made of various materials, including, for example, glass, plastic, etc. The cover 320 may be a clear cover or a tinted cover. The portion 315 of the housing 110 may be used as a rear cover for the imaging device 305. For example, the portion 315 may be adjacent to the circuit board 170, which is disposed between the portion 310 and the portion 315 of the housing 110.

The portion 310 of the housing 110 may be used as a main housing for the imaging device 305. For example, the portion 310 may provide a thermally conductive (rigid) support structure for the one or more image sensor assemblies 140 of the imaging device 305. That is, the portion 310 may serve as a backing plate and as a heat sink for the one or more image sensors 145 of the one or more respective image sensor assemblies 140. In certain embodiments, the rigid support structure of the portion 310 may maintain consistent distance (baseline) and orientation of the image sensor assemblies 140 in the presence of phenomena, such as shock, vibrations, thermal expansion, etc. For example, as shown in FIG. 3E, each circuit board 155 of an image sensor assembly 140 is supported by the portion 310 all around the circuit board 155. That is, each edge of the circuit board 155 is in contact with the portion 310. Using this type of contact between the portion 310 and the circuit board 155 can increase stiffness of the circuit board and minimize shift of the image sensor assembly 140 (including components thereon) due to phenomena, such as shock, vibrations, thermal expansion, etc.

The portion 310 may include one or more cutout locations 340 for disposing one or more respective image sensor assemblies 140. Here, for example, the portion 310 includes a cutout location 340-1 for disposing an image sensor assembly 140-1 and a cutout location 340-2 for disposing an image sensor assembly 140-2 (FIG. 3C). The image sensor assemblies 140 1-2 may be coupled to the circuit board 170 through the respective cutout locations 340 1-2 via respective connectors 175 1-2.

The portion 310 may also include one or more (clearance) holes 345 formed on the portion 310 and/or one or more fastening components 350 disposed on the portion 310. The holes 345 and/or fastening components 350 may be used for attaching the one or more image sensor assemblies 140 to the portion 310 and/or positioning the one or more image sensor assemblies 140 to the portion 310. For example, the portion 310 includes two holes 345 and two fastening components 350 for attaching and/or positioning the image sensor assembly 140-1, and includes two holes 345 and two fastening components 350 for attaching and/or positioning the image sensor assembly 140-2 (FIGS. 3C-3E).

Each image sensor assembly 140 1-2 may include one or more holes (also referred to as hole locations) and/or one or more slots (also referred to as slot locations) through which one or more fastening components may feed through in order to attach and/or position the respective image sensor assembly 140 to the portion 310. That is, a position of the circuit board 155 of the image sensor assembly 140 (attached to the portion 310) may be adjustable via at least one of (i) a position of a fastening component through a hole on the circuit board 155 or (ii) a position of a fastening component through a slot on the circuit board 155. Here, for example, each image sensor assembly 140 includes two holes 365, a hole 360, and a slot 395 formed within the respective circuit board 155 of the image sensor assembly 140. The circuit board 155 may be attached to the portion 310 via (i) (two) fastening components 390 that feed through the (two) holes 365, (ii) a fastening component 350 that feeds through the hole 360, and (iii) a fastening component 350 that feeds through the slot 395 (FIGS. 3C-3E). By configuring an image sensor assembly 140 with holes and slots in the manner depicted in FIGS. 3A-3E, embodiments can more precisely attach and/or position an image sensor assembly 140 to the portion 310 in a target (or desired) location. Note that while FIGS. 3D and 3E depict the slots 395 as oriented vertically, in other embodiments, the slots 395 may be slanted.

In some embodiments, each image sensor assembly 140 may be identical, but may be oriented differently within the imaging device 105. For example, as shown in FIG. 3E, the image sensor assemblies 140 1-2 are the same, where image sensor assembly 140-2 is rotated 180° relative to image sensor assembly 140-1 (and vice versa). Using the same image sensor assembly 140 may allow an imaging device 105 to have multiple imaging sensors 145 at different baselines.

In some embodiments, an active alignment procedure may be performed to actively align and attach the imaging optic(s) 150 of each image sensor assembly 140 to the optics holder 160 of the image sensor assembly 140. In the embodiment depicted in FIGS. 3A-3E, the active alignment procedure may be performed prior to attaching the image sensor assembly 140 to the portion 310 of the housing 110 of the imaging device 305.

Figure 4A:
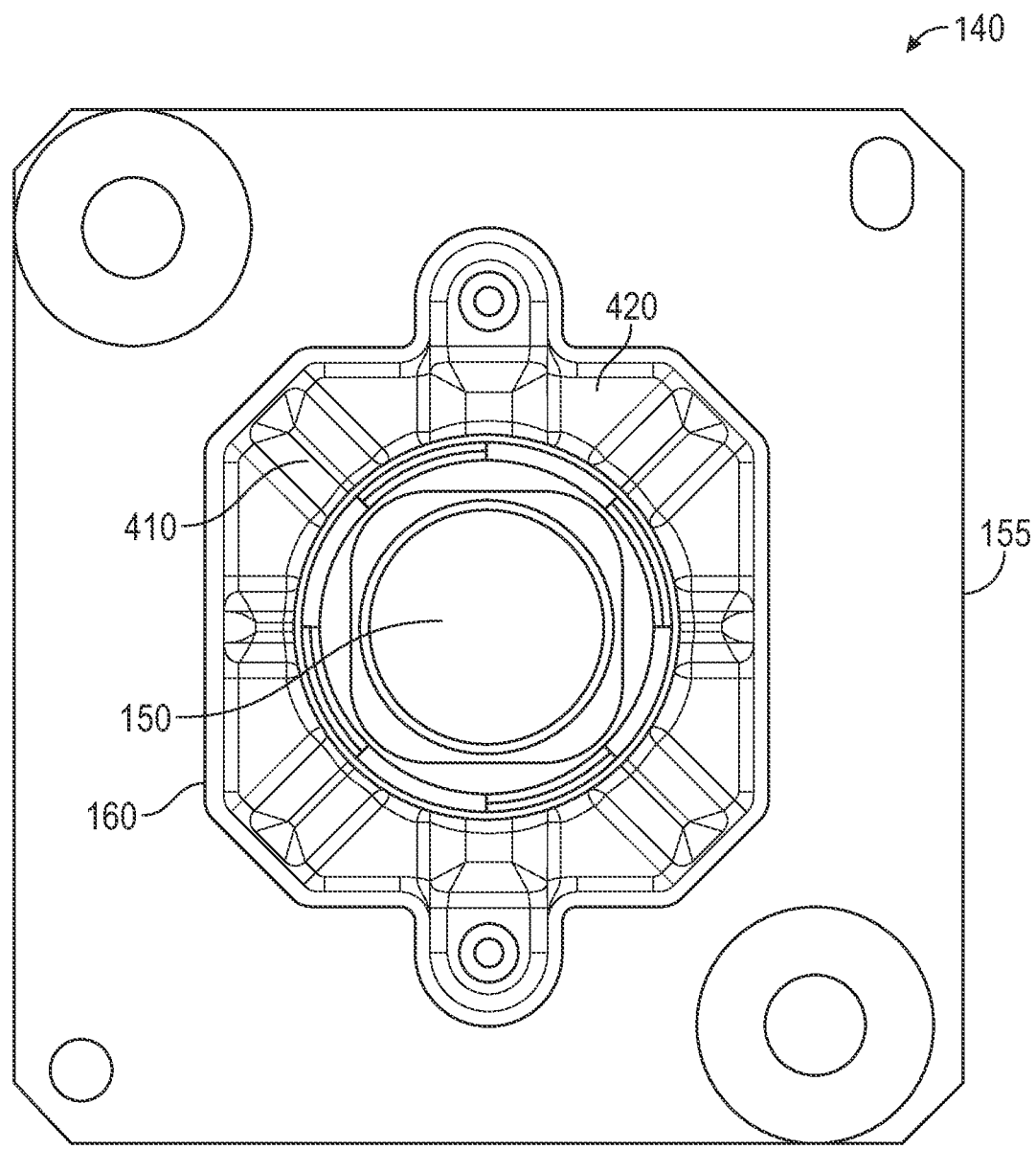
FIGS. 4A-4B illustrate different views of an example image sensor assembly of the imaging device illustrated in FIGS. 3A-3E, according to one embodiment.
Figure 4B:
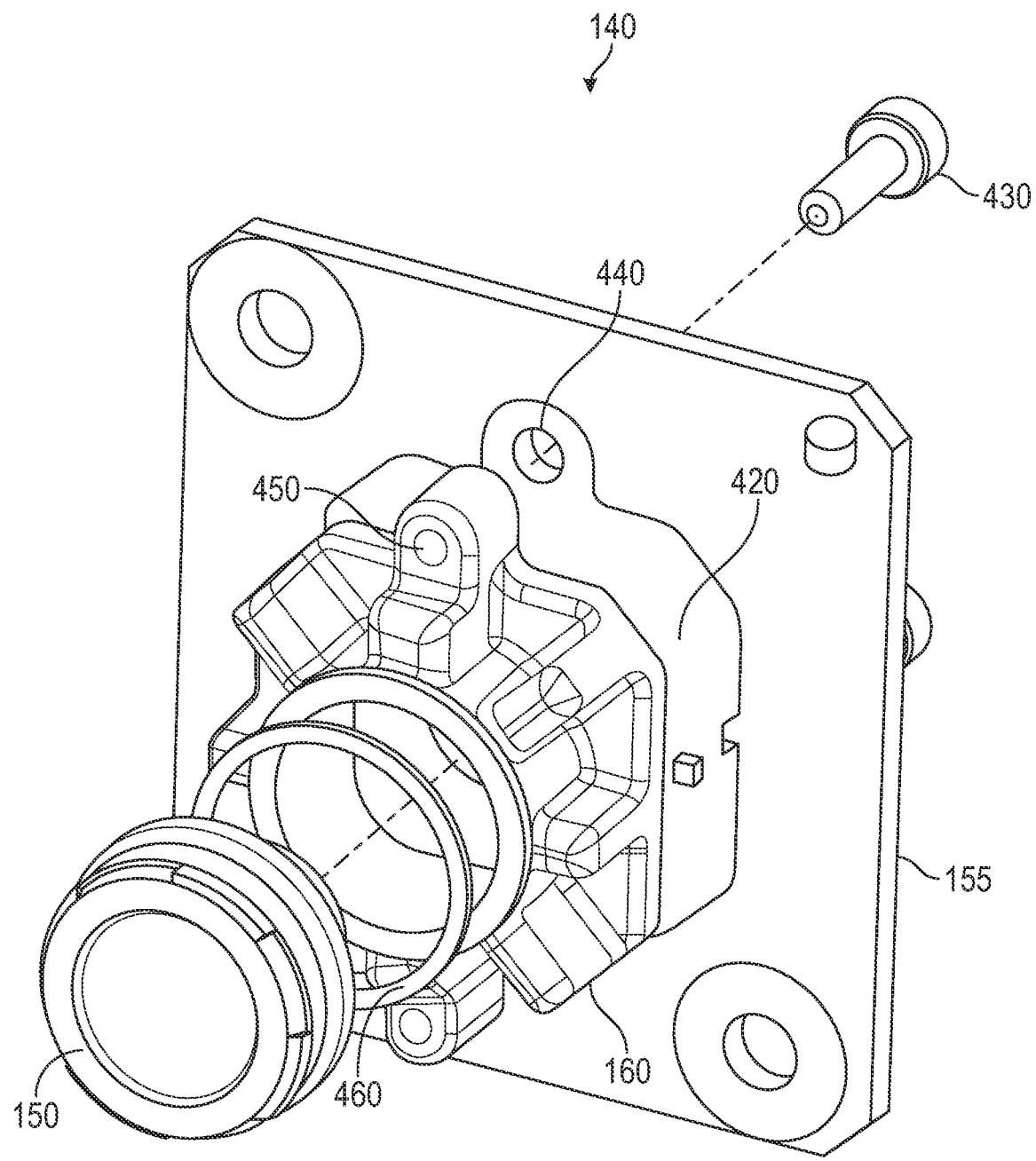

In the embodiment depicted in FIGS. 3A-3E, the optics holder 160 (including the imaging optics 150) of each image sensor assembly 140 may not be directly attached to the portion 310 of the housing 110. That is, the circuit board 155 of the image sensor assembly 140 may be attached to the portion 310 using a first set of holes and/or slots and using a first set of fastening components, and the optics holder 160 may be attached to the circuit board 155 of the image sensor assembly 140 using a second set of holes and/or slots and using a second set of fastening components. An exemplary attachment of optics holder 160 to the circuit board 155 is illustrated in FIGS. 4A-4B, which further illustrate an image sensor assembly 140 of the imaging device 305 depicted in FIG. 3, according to one embodiment. In particular, FIG. 4A illustrates a front view of the image sensor assembly 140 and FIG. 4B illustrates an exploded view of the image sensor assembly 140, according to one embodiment.

As shown in FIGS. 4A-4B, the optics holder 160 includes one or more fins 410 (e.g., 8 fins depicted in FIGS. 4A-4B), which are used to facilitate (e.g., increase) heat transfer away from the image sensor 145 (not shown), disposed adjacent to the optics holder 160 (e.g., below the optics holder 160 in the z direction). Each fin 410 is generally an extended surface that extends outward in a direction away from the circuit board 155. Each of the fins 410 may include (or be filled with) a thermal conductive material, such as aluminum. In some embodiments, the circuit board 155 may also include one or more vias 420 (also referred to as thermal vias) to facilitate the heat transfer within the circuit board 155 away from the image sensor 145. The vias 420 may be disposed under a portion of the surface of the circuit board 155 that is in contact with the surface of the optics holder 160.

In some embodiments, the image sensor assembly 140 is designed to maintain a substantially large contact area between the circuit board 155 and the optics holder 160 in order to transfer the heat dissipated by the image sensor 145 into the optics holder 160. In one embodiment, the minimum size of the contact area is a function of power. For example, the size of the contact area between the optics holder 160 and the circuit board 155 may be based at least in part on a power consumption of the image sensor assembly 140 (including a power consumption of one or more (or combination of) components of the image sensor assembly 140). In a particular embodiment, the size of the contact area is a function of the power consumption of the image sensor 145 of the image sensor assembly 140. In this embodiment, the size of the contact area may be greater than (or equal to) 400 square millimeters ($mm^2$) per 1 watt of power consumption of the image sensor assembly 140 (or of one or more (or combination of) components of the image sensor assembly 140).

The optics holder 160 provides a mounting location (or bracket) for disposing the imaging optic(s) 150 (e.g., optical lens). As shown in FIGS. 4A-4B, the imaging optic(s) 150 is disposed within the mounting location of the optics holder 160 via the attachment 460. The optics holder 160 also includes one or more holes 450 formed on one or more fins 410 of the optics holder 160, and the circuit board 155 includes one or more holes 440 formed on the circuit board 155. The optics holder 160 may be attached to the circuit board 155 via one or more fastening components 430 that feed through the one or more respective holes 440 of the circuit board 155 and through the one or more respective holes 450 of the optics holder 160. In some embodiments, the optics holder 160 can be used to increase stiffness of the circuit board 155 around the image sensor, reducing and minimize shift of the circuit board 155 due to various phenomena, described above.

Figure 5A:
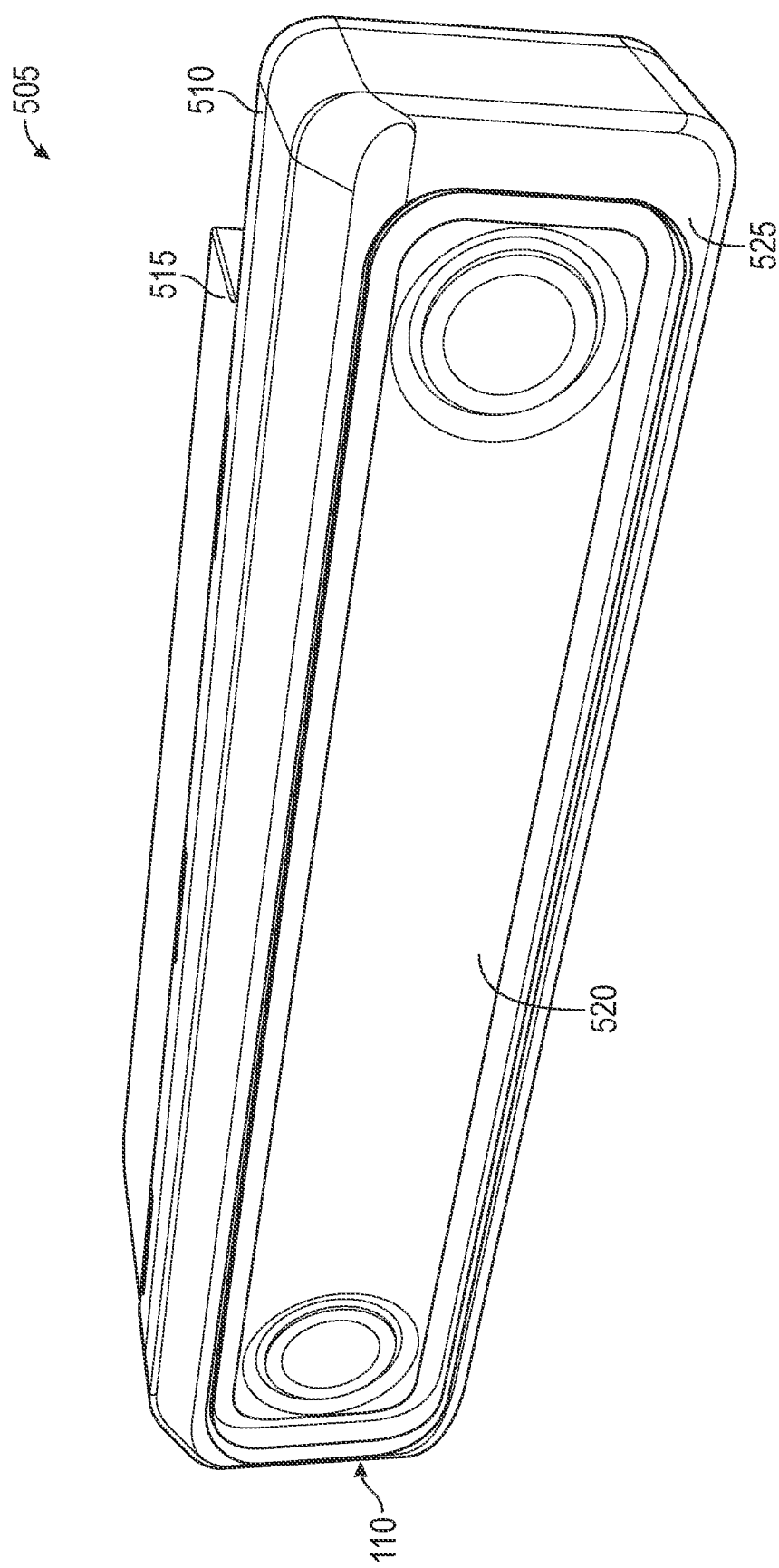
FIGS. 5A-5C illustrate different views of another example imaging device, according to one embodiment.
Figure 5B:
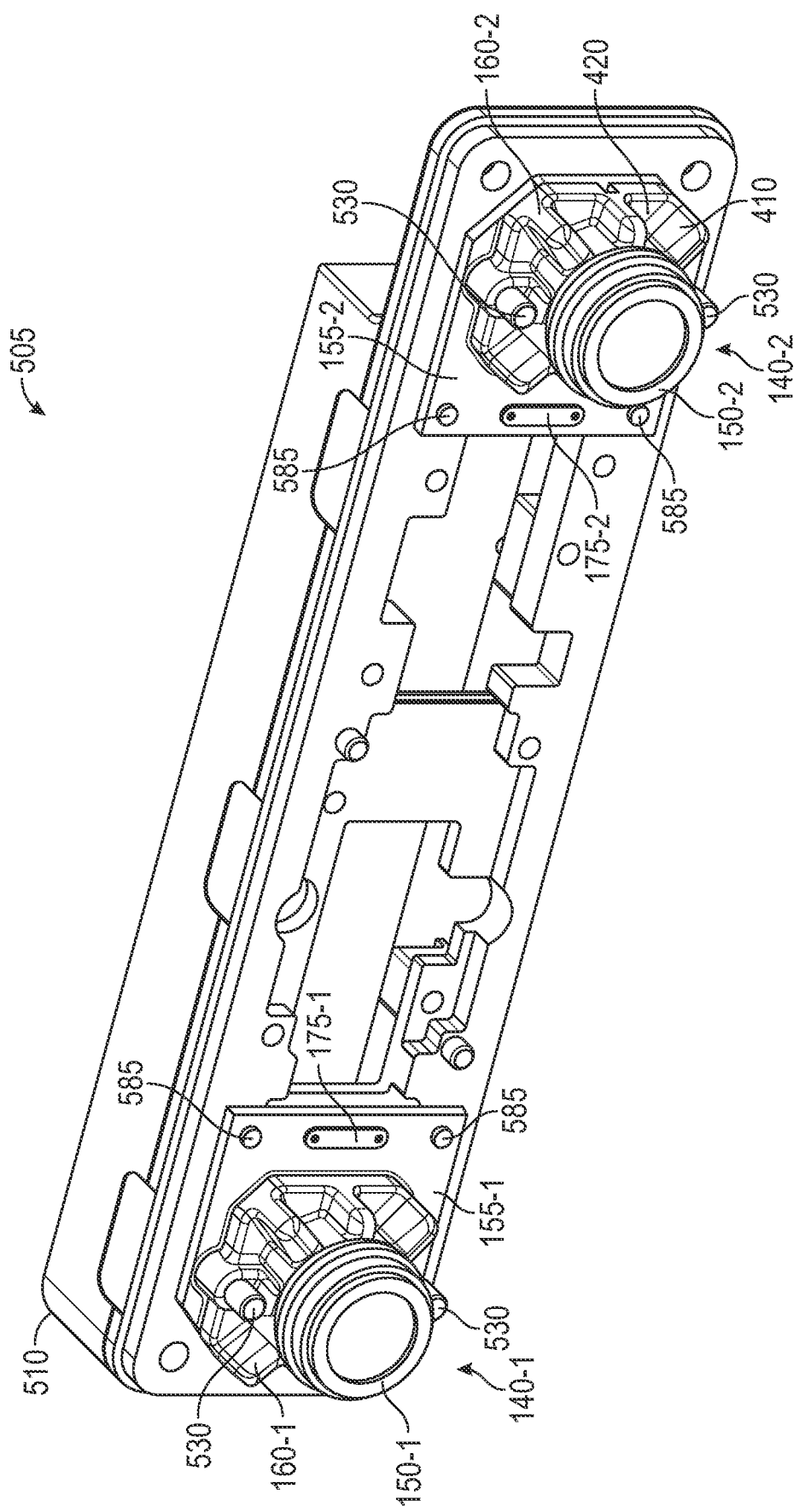
Figure 5C:
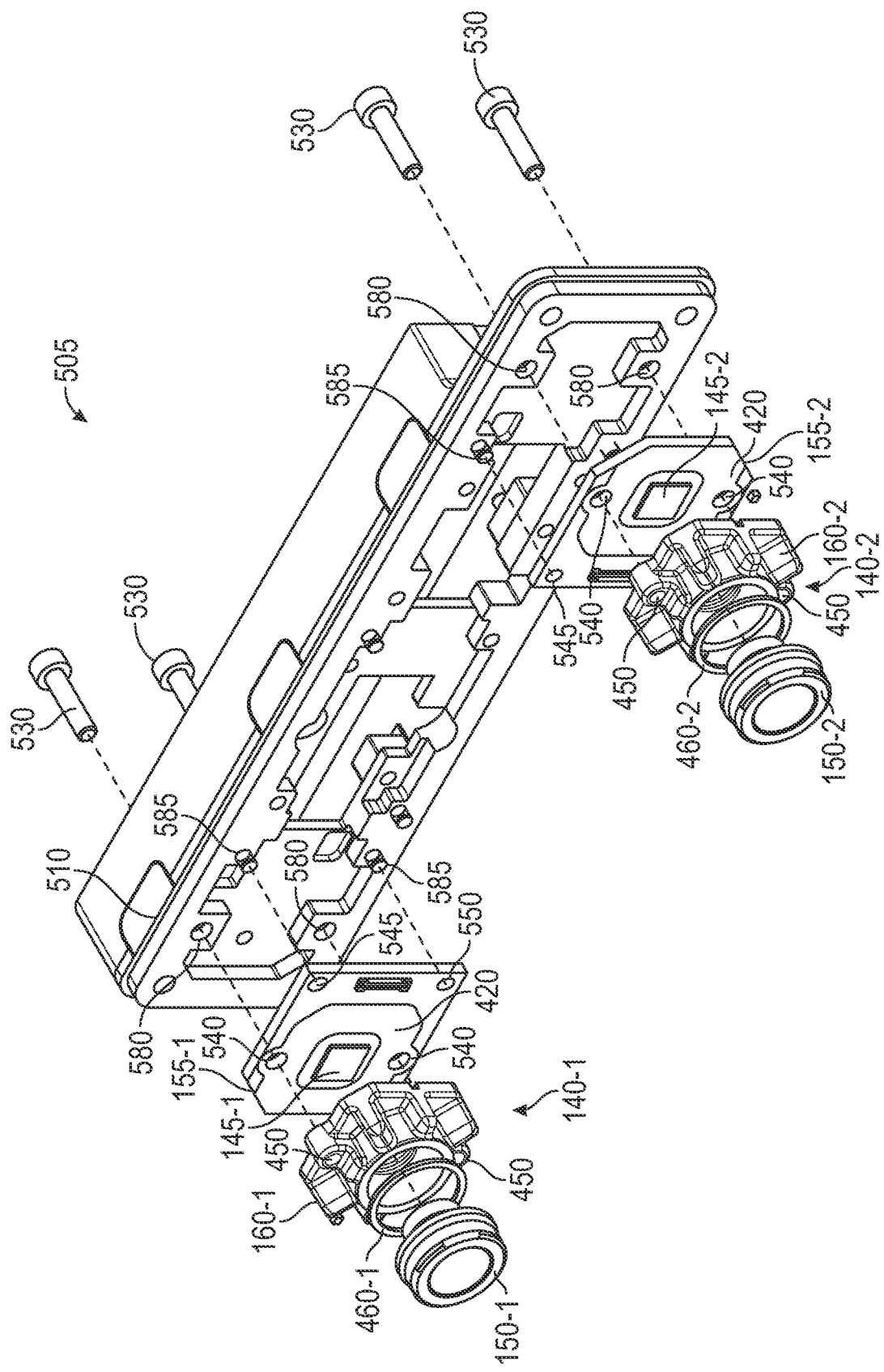

FIGS. 5A-5C illustrate different views of an example imaging device 505, according to one embodiment. In particular, FIG. 5A depicts a perspective view of the imaging device 505, FIG. 5B depicts a perspective cross-sectional view the imaging device 505, and FIG. 5C depicts an exploded view of the cross-sectional view of imaging device 505 in FIG. 5B, according to one embodiment. The imaging device 505 is a representative embodiment of the imaging device 105 depicted in FIG. 1. For example, in the depicted embodiment, the imaging device 505 is a stereo camera with two image sensors 145.

Similar to the imaging device 305, the imaging device 505 includes a housing 110 with a portion 525 (similar to portion 325), a portion 510 (similar to portion 310), and a portion 515 (similar to portion 315) (FIG. 5A). The imaging device 505 also includes a cover 520 (similar to cover 320) disposed on the portion 525 (FIG. 5A).

Compared to the imaging device 305, the image sensor assemblies 140 of the imaging device 505 may have a significantly smaller footprint and/or may be more robust against various phenomena, such as shock, vibrations, thermal expansion due to temperature changes, etc. As shown in FIGS. 5B-5C, each image sensor assembly 140 includes an optics holder 160 that is directly attached to the portion 510 of the housing 110 through the circuit board 155 of the image sensor assembly 140.

For example, the portion 510 of the housing 110 includes one or more (clearance) holes 580 formed on the portion 510 and/or one or more fastening components 585 disposed on the portion 510. The holes 580 and/or fastening components 585 may be used for attaching the image sensor assemblies 140 (including components thereon) to the portion 510 and/or positioning the one or more image sensor assemblies 140 to the portion 510. For example, the portion 510 includes two holes 580 and two fastening components 585 for attaching and/or positioning the image sensor assembly 140-1, and includes two holes 580 and two fastening components 585 for attaching and/or positioning the image sensor assembly 140-2 (FIG. 5C).

Figure 6:
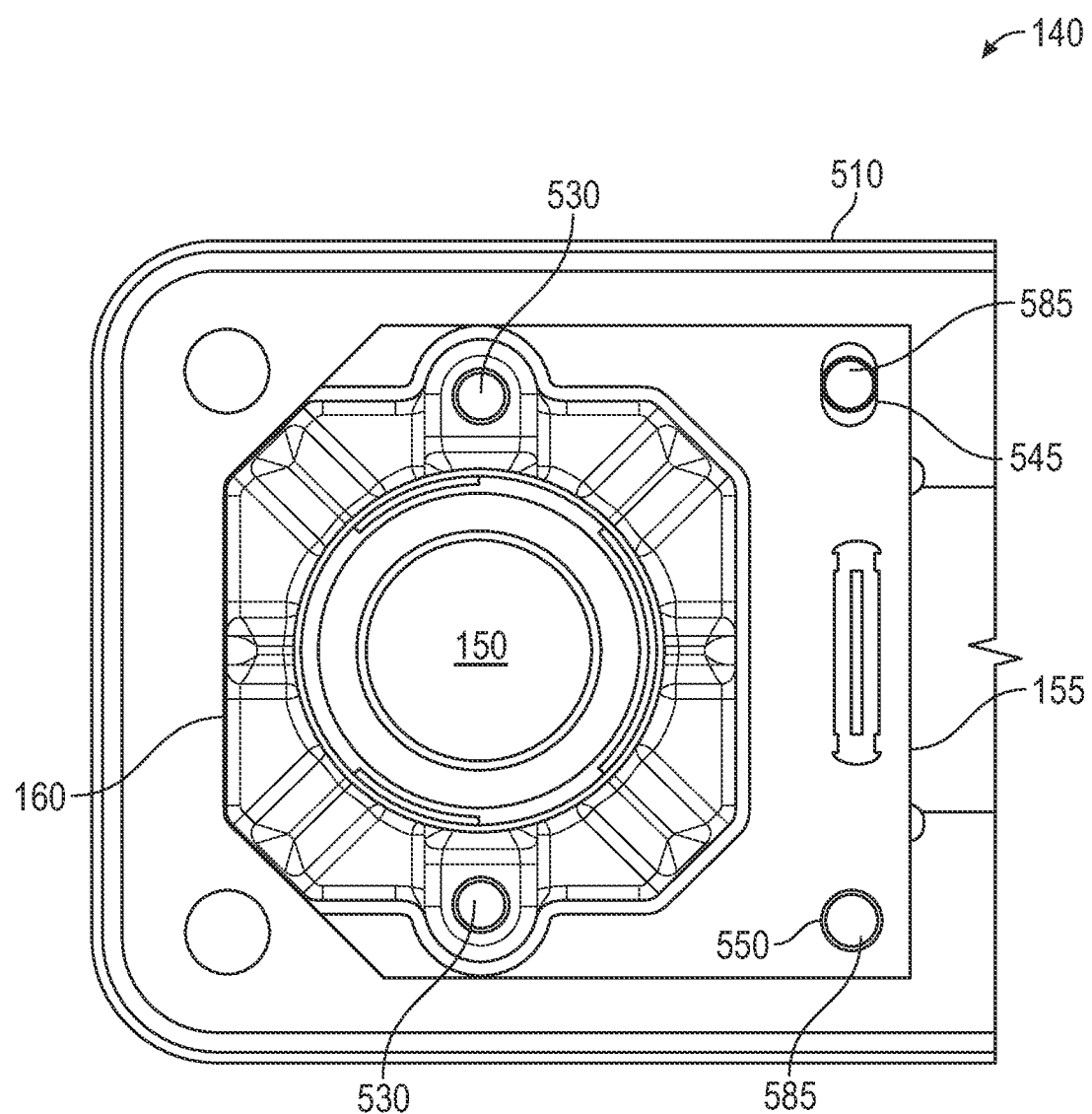
FIG. 6 illustrates a view of an example image sensor assembly of the imaging device illustrated in FIGS. 5A-5C, according to one embodiment.

Additionally, each image sensor assembly 140 includes one or more holes 540, one or more holes 550, and one or more slots 545 formed on the circuit board 155 of the image sensor assembly 140. The optics holder 160 of the image sensor assembly 140 may be attached to the portion 510 via one or more fastening components 530, which feed through (i) the one or more respective holes 580 of the portion 510 of the housing 110, (ii) the one or more respective holes 540 of the circuit board of the image sensor assembly 140, and (iii) the one or more respective holes 450 of the optics holder 160 of the image sensor assembly 140. In addition to attaching the optics holder 160 to the portion 510 through the circuit board 155, the circuit board 155 may be attached and/or positioned to the portion 510 of the housing via one or more fastening components 585 that feed through the respective hole 550 and slot 545 on the circuit board 155. That is, a position of the circuit board 155 of the image sensor assembly 140 (attached to the portion 510) may be adjustable via at least one of (i) a position of a fastening component through a hole 550 on the circuit board 155 or (ii) a position of a fastening component through a slot 545 on the circuit board 155. Similar to the imaging device 305 depicted in FIGS. 3A-3E, the image sensor assembly 140-1 of the imaging device 505 is the same as the image sensor assembly 140-2 of the imaging device 505, except that the image sensor assembly 140-2 is rotated 180° with respect to the image sensor assembly 140-1 (and vice versa). A front view of an example image sensor assembly 140 of the imaging device 505 attached to the portion 510 of the imaging device 505 is depicted in FIG. 6.

By attaching the optics holder 160 to the portion 310 of the housing 110 in the manner shown in FIGS. 5A-5C, embodiments provide a "sandwich" assembly technique that can significantly mitigate effects of phenomena on the image sensor 145. For example, from a mechanical tolerance perspective, the embodiment depicted in FIGS. 5A-5C remove an additional assembly step by directly attaching the portion 510 to the optics holder 160 of an image sensor assembly 140 (e.g., as opposed to attaching the optics holder 160 to the circuit board 155, and then attaching the circuit board 155 to the portion 510).

Additionally, by directly attaching the portion 510 to the optics holder 160, embodiments can significantly reduce the size of the circuit board 155, relative to the size of the circuit board 155 depicted in FIGS. 3A-3E. Such a reduced circuit board size allows for a smaller overall imaging device footprint. Additionally, the reduced circuit board size allows for the optics holder 160 to be in contact with a larger percentage of the surface area of the circuit board 155 (relative to the embodiment depicted in FIGS. 3A-3E). This, in turn, enables the optics holder 160 to act as a mechanical stiffener, preventing the circuit board 155 from bending and minimizing calibration error as a result.

Additionally, by disposing the circuit board 155 between the optics holder 160 and the portion 510 of the housing 110 and thermally coupling the optics holder 160 to the via the fastening components 530 (as illustrated in FIGS. 5A-5C and 6), embodiments can significantly improve the thermal dissipation from the image sensor 145 to the outside of the imaging device 505, leading to less optical distortion due to thermal expansion of components, such as imaging optics 150. For example, similar to the circuit board 155 of the image sensor assembly 140 depicted in FIGS. 3A-3E, the circuit board 155 of the image sensor assembly 140 depicted in FIGS. 5A-5C and 6 may include one or more vias 420 to facilitate heat transfer within the circuit board 155 away from the image sensor 145. The one or more vias 420 may be disposed under the portion of the surface of the circuit board 155 that is in contact with the surface of the optics holder 160. As noted, the size of this contact area may be a function of the power consumption of the image sensor assembly 140 (including the power consumption of one or more (or a combination of) components of the image sensor assembly 140, such as the image sensor 145). For example, in a particular embodiment, the size of the contact area between the optics holder 160 and the circuit board 155 is greater than (or equal to) 400 $mm^2$/1 watt of power consumption of the image sensor assembly 140 (or of one or more (or combination of) components of the image sensor assembly 140).

In certain embodiments, with the imaging device 505, an active alignment procedure may be performed to actively align and attach the imaging optic(s) 150 of each image sensor assembly 140 after the image sensor assembly 140 is attached to the portion 510 of the housing 110 of the imaging device 505.

Figure 7A:
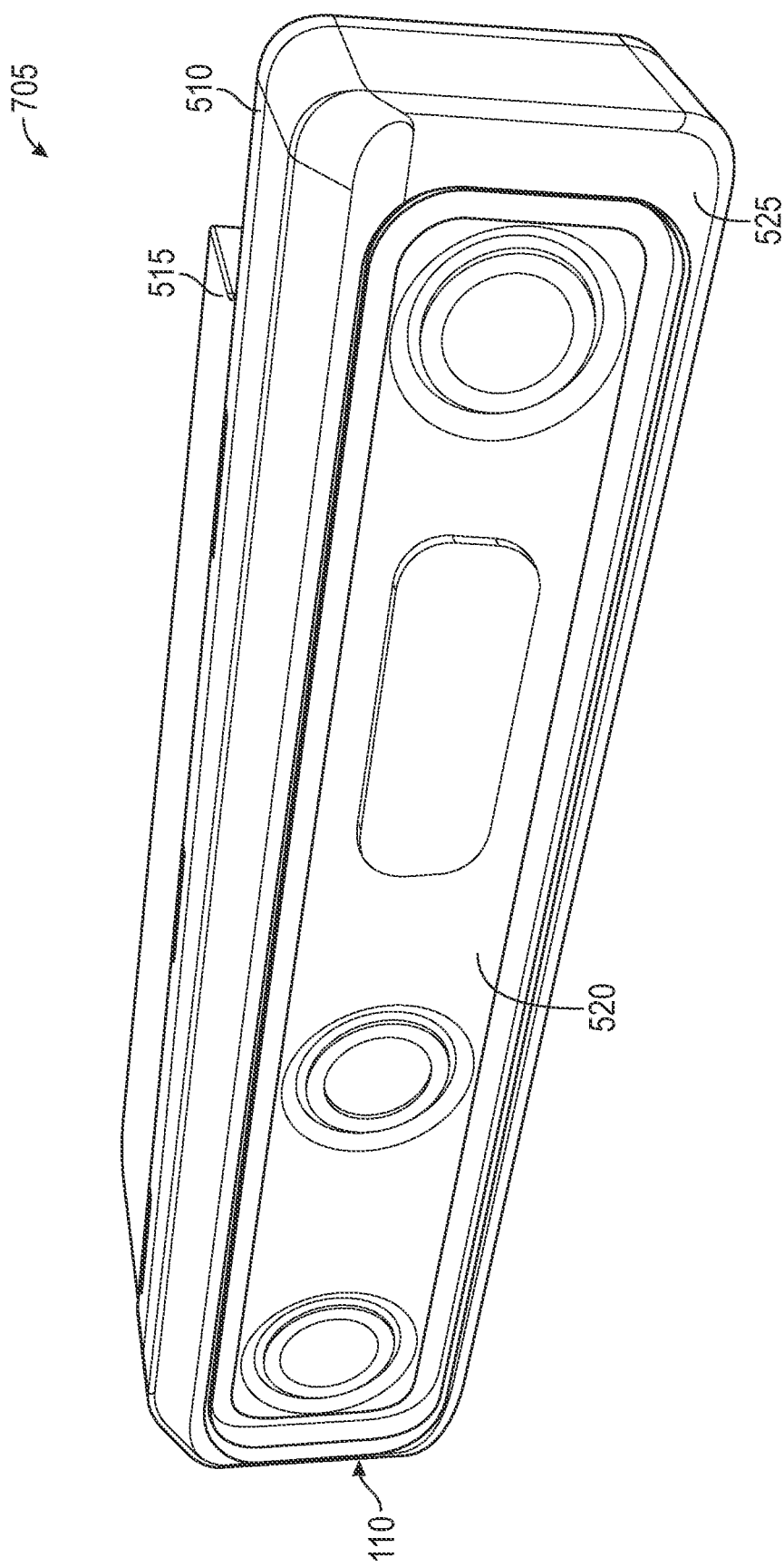
FIGS. 7A-7B illustrate different views of another example imaging device, according to one embodiment.
Figure 7B:
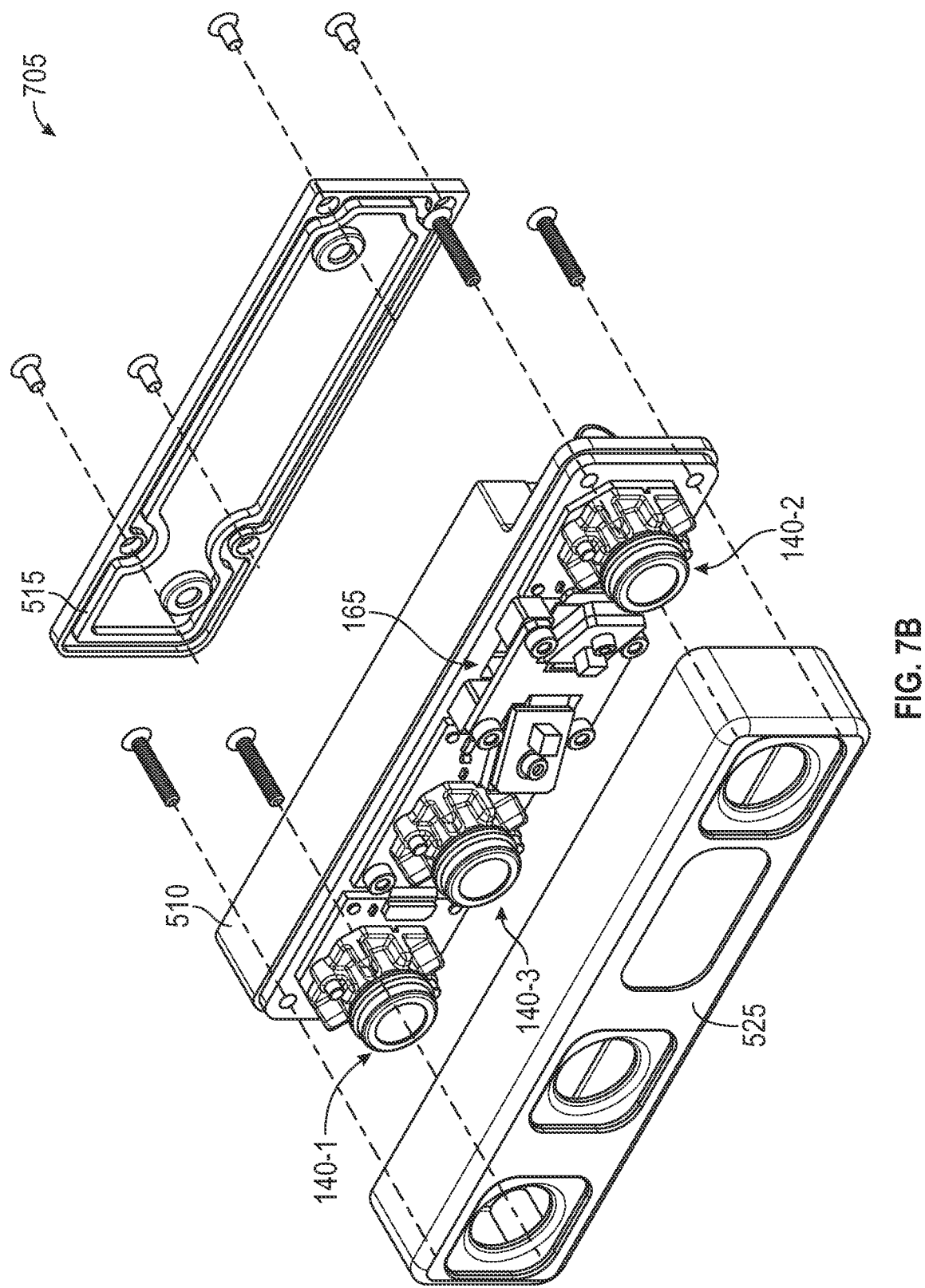

FIGS. 7A-7B illustrate different views of an example imaging device 705, according to one embodiment. In particular, FIG. 7A depicts a perspective view of the imaging device 705 and FIG. 7B depicts an exploded view of the imaging device 705, according to one embodiment. The imaging device 705 is a representative embodiment of the imaging device 105 depicted in FIG. 1. For example, in the depicted embodiment, the imaging device 705 includes (i) a stereo camera, which includes image sensor assemblies 140-1 and 140-2, (ii) a RGB camera, which includes image sensor assembly 140-3, and (iii) an illuminator/projector 165.

Figure 8:
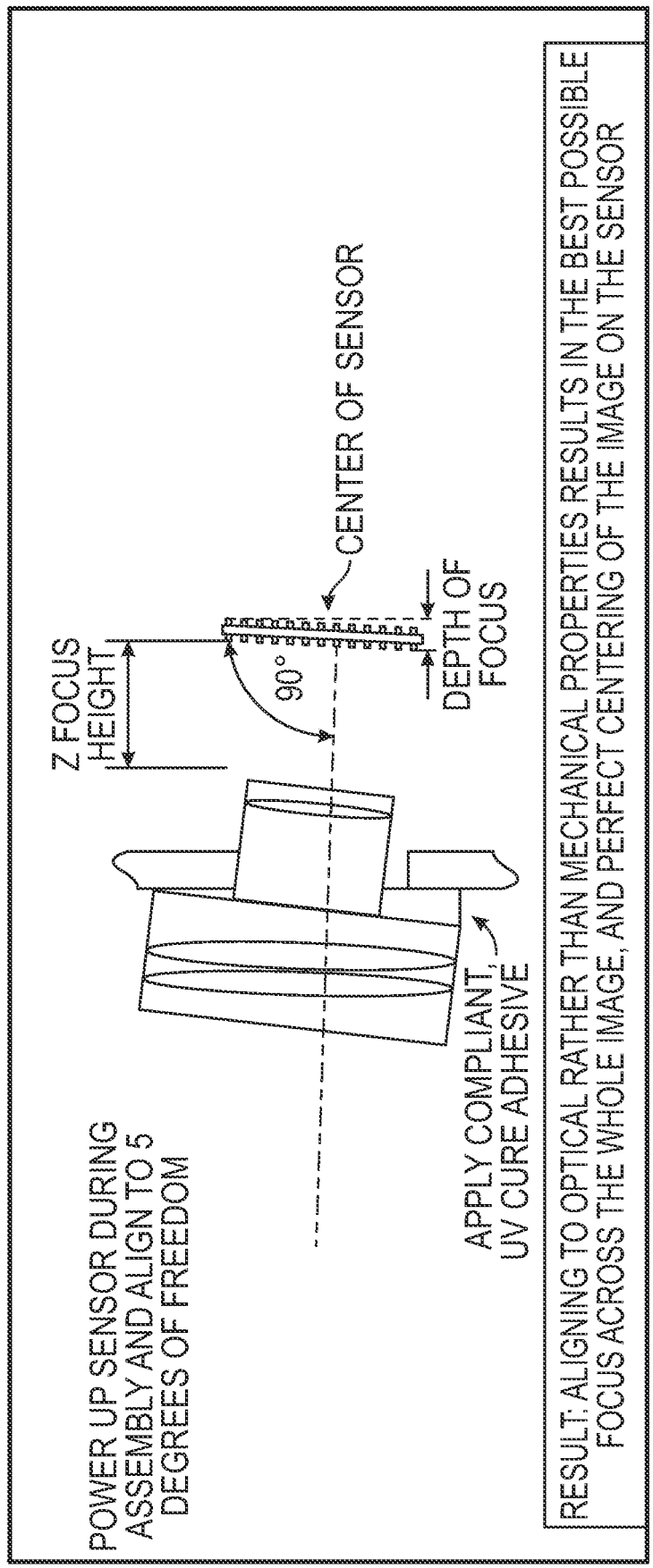
FIG. 8 illustrates an example active alignment procedure, according to one embodiment.

FIG. 8 illustrates an example active alignment procedure, according to one embodiment. Active alignment generally refers to a process by which elements of an imaging optic(s) 150 (e.g., optical lens) can be adjusted into proper alignment during the assembly process. Compared to a passive alignment, which is based on mechanical properties of an optical lens, active alignment is performed based on the optical properties of the optical lens. For example, the image sensor 145 may be powered up during assembly and aligned to various different target parameters. In certain embodiments, the active alignment may be performed using an automated motion system (e.g., robotic arm) that moves the position and/or orientation of the optics lens to various targets to determine the proper focus, centering, etc. In some embodiments, an adhesive may be applied to the imaging optics 150 within the optics holder 160 to restrict movement during active alignment. Once the desired focus, centering, etc., are achieved, the adhesive may be cured to attach the imaging optics 150 to the optics holder 160.

Figure 9:
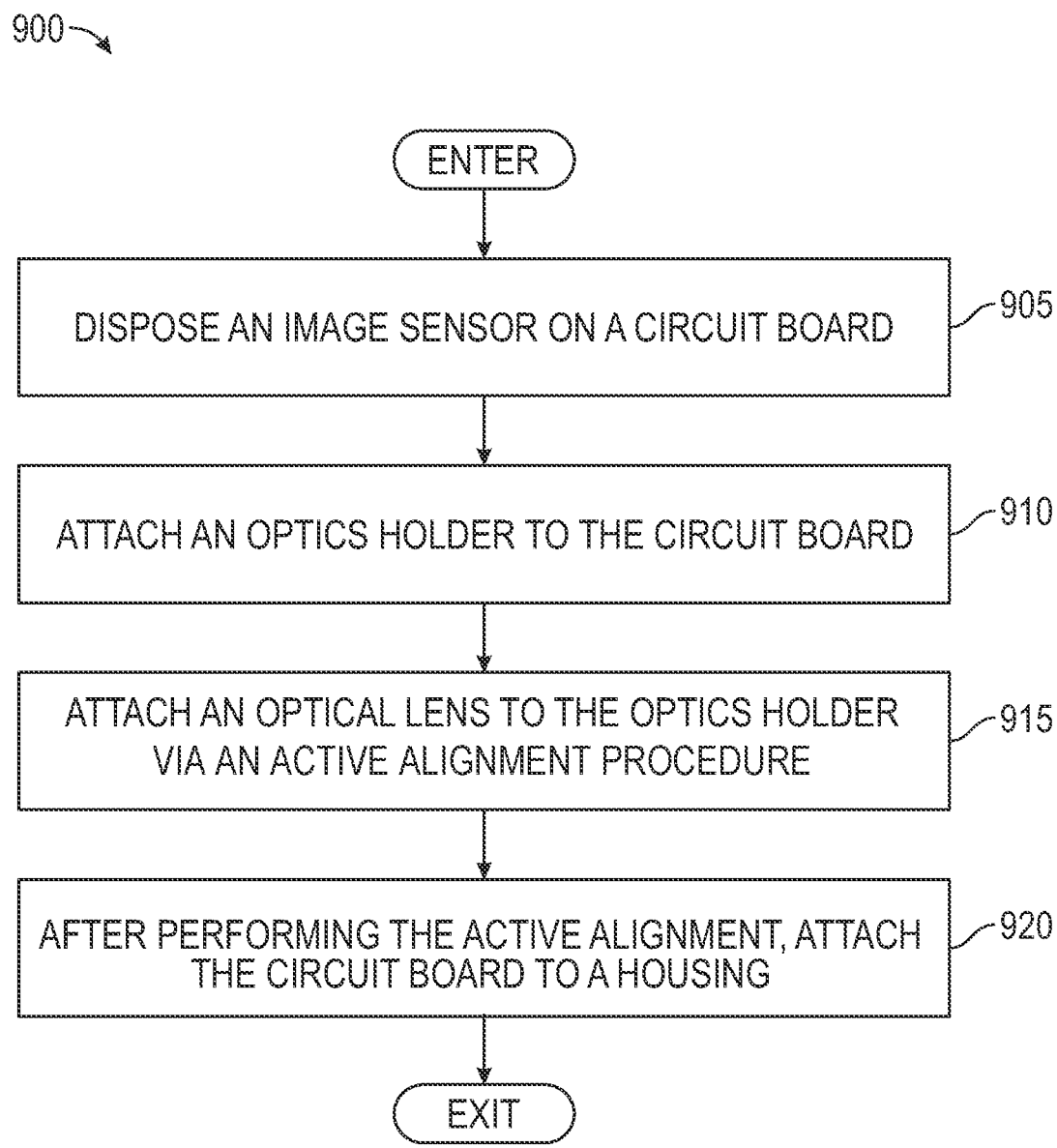
FIG. 9 is a flowchart of a method for assembling an imaging device, according to one embodiment.

FIG. 9 is a flowchart of a method 900 for assembling an imaging device (e.g., imaging device 305), according to one embodiment. The method 900 may be performed by an apparatus (e.g., robotic assembly). In certain embodiments, the method 900 may be performed for each image sensor of the imaging device 105.

Method 900 enters at block 905, where an image sensor (e.g., image sensor 145) is disposed on a circuit board (e.g., circuit board 155). At block 910, an optics holder (e.g., optics holder 160) is attached to the circuit board. In certain embodiments, the optics holder is attached to the circuit board via a fastening component (e.g., fastening component 430) that feeds through a hole (e.g., hole 440) on the circuit board and a hole (e.g., hole 450) of the optics holder.

At block 915, an optical lens (e.g., imaging optics 150) is attached to (or disposed in) the optics holder via an active alignment procedure. At block 920, the circuit board is attached to a housing (e.g., portion 310 of housing 110) after performing the active alignment. In certain embodiments, the circuit board is attached to the housing via one or more fastening components (e.g., fastening components 390 and 350), one or more holes (e.g., holes 365, 360) and/or one or more slots (e.g., slots 395).

Figure 10:
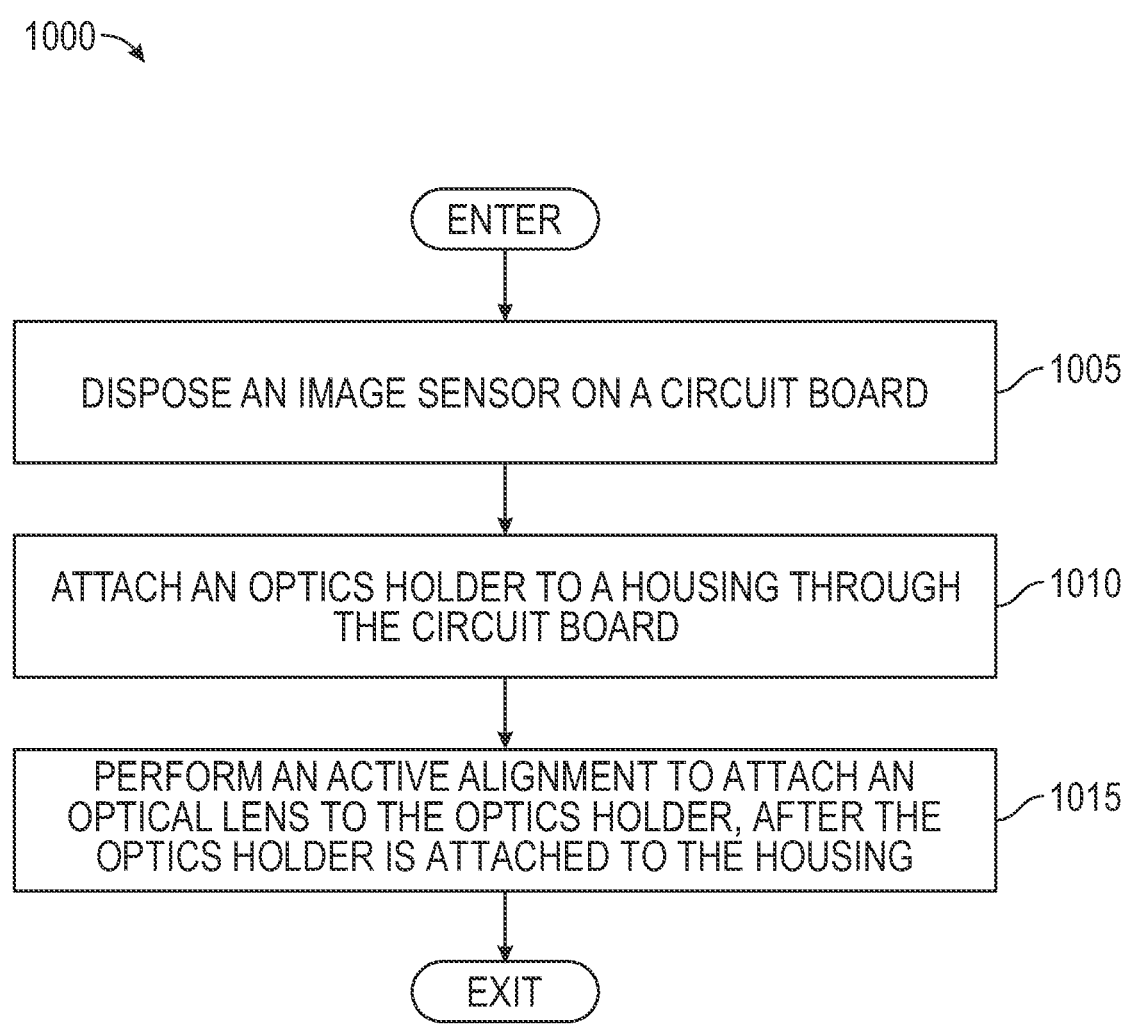
FIG. 10 is a flowchart of another method for assembling an imaging device, according to one embodiment.

FIG. 10 is a flowchart of a method 1000 for assembling an imaging device (e.g., imaging device 505), according to one embodiment. The method 1000 may be performed by an apparatus (e.g., robotic assembly).

Method 1000 enters at block 1005, where an image sensor (e.g., image sensor 145) is disposed on a circuit board (e.g., circuit board 155). At block 1010, an optics holder (e.g., optics holder 160) is attached to a housing (e.g., portion 510 of housing 110) through the circuit board. In certain embodiments, the optics holder is attached to the housing via a fastening component (e.g., fastening component 530) that feeds through (i) a hole (e.g., hole 580) on the housing, (ii) a hole (e.g., hole 540) on the circuit board, and (iii) a hole (e.g., hole 450) on the optics holder.

At block 1015, an active alignment is performed to attach an optical lens (e.g., imaging optics 150) to the optics holder, after the optics holder is attached to the housing through the circuit board.

Advantageously, embodiments described herein can reduce the size of the overall imaging device (including the sizes of one or more individual component sizes included within), the size of the bill of materials (BOM) for an imaging device, and/or the BOM cost while improving mechanical stiffness, thermal dissipation, and assembly error optimization.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An apparatus comprising:
a housing comprising a first thermally conductive material; and
a plurality of image sensor assemblies, wherein a first image sensor assembly of the plurality of image sensor assemblies comprises:
a first circuit board;
a first image sensor disposed on the first circuit board;
a first optics holder comprising a second thermally conductive material and attached to the housing through the first circuit board, wherein the first circuit board is disposed between the first optics holder and the housing, wherein the first optics holder comprises a plurality of extended surfaces that extend in a direction away from the first circuit board, wherein the plurality of extended surfaces are adapted to transfer heat away from the first image sensor, wherein a surface of the first optics holder is in contact with a portion of a surface of the first circuit board and wherein the first optics holder comprises a support location; and
a first optical lens disposed in the support location of the first optics holder.

2. The apparatus of claim 1, wherein a second image sensor assembly of the plurality of image sensor assemblies comprises:
a second circuit board;
a second image sensor disposed on the second circuit board;
a second optics holder comprising the second thermally conductive material and attached to the housing through the second circuit board, wherein the second circuit board is disposed between the second optics holder and the housing, and wherein the second optics holder comprises a support location; and
a second optical lens disposed in the support location of the second optics holder.

3. The apparatus of claim 1, wherein the first optics holder is attached to the housing with a fastening component that extends through (i) a first hole on the housing, (ii) a second hole on the first circuit board, and (iii) a third hole on the first optics holder.

4. The apparatus of claim 1, wherein each of the plurality of extended surfaces comprises the first thermally conductive material.

5. The apparatus of claim 1, wherein a size of a contact area between the surface of the first optics holder and the portion of the surface of the first circuit board is a function of a power consumption of the first image sensor.

6. The apparatus of claim 5, wherein the size of the contact area is greater than or equal to 400 square millimeters per 1 watt of power consumption of the first image sensor.

7. The apparatus of claim 5, wherein the first circuit board comprises one or more vias located under the portion of the surface of the first circuit board that is in contact with the surface of the first optics holder.

8. An image sensor assembly disposed within an imaging device, the image sensor assembly comprising:
a circuit board;
an image sensor disposed on the circuit board;
an optics holder attached to a housing of the imaging device, the optics holder comprising a support location and comprising a thermally conductive material, wherein:
the optics holder comprises a plurality of extended surfaces that extend outward in a direction away from the circuit board, wherein a surface of the optics holder is in contact with a portion of a surface of the circuit board;
each of the plurality of extended surfaces comprises the thermally conductive material; and
the plurality of extended surfaces are adapted to transfer heat away from the first image sensor; and
an optical lens disposed in the support location of the optics holder, wherein the circuit board is disposed between the optics holder and the housing of the imaging device.

9. The image sensor assembly of claim 8, wherein the optics holder is attached to the housing through the circuit board via a first fastening component.

10. The image sensor assembly of claim 9, wherein the circuit board is attached to the housing via at least one of: (i) a second fastening component at a hole location of the circuit board or (ii) a third fastening component at a slot location of the circuit board.

11. The image sensor assembly of claim 10, wherein a position of the circuit board is adjustable via a position of the third fastening component within the slot location of the circuit board.

12. The image sensor assembly of claim 8, wherein:
the optics holder is attached to the circuit board via a first fastening component at a first hole location of the circuit board; and
the circuit board is attached to the housing via a second fastening component at a second hole location of the circuit board.

13. The image sensor assembly of claim 12, wherein the circuit board is further attached to the housing via a third fastening component at a slot location of the circuit board.

14. The image sensor assembly of claim 13, wherein a position of the circuit board is adjustable via a position of the third fastening component within the slot location of the circuit board.

15. The image sensor assembly of claim 8, wherein each edge of the circuit board is in contact with a surface of the housing.

16. The image sensor assembly of claim 8, wherein a size of a contact area between the surface of the optics holder and the portion of the surface of the circuit board is a function of a power consumption of the image sensor.

17. The image sensor assembly of claim 16, wherein the size of the contact area is greater than or equal to 400 square millimeters per 1 watt of power consumption of the image sensor.

18. The image sensor assembly of claim 16, wherein the circuit board comprises one or more vias located under the portion of the surface of the circuit board that is in contact with the surface of the optics holder.

* * * * *